United States Patent [19]
Takase et al.

[11] Patent Number: 4,760,344
[45] Date of Patent: Jul. 26, 1988

[54] PHASE SHIFT KEYING SIGNAL DEMODULATION METHOD AND APPARATUS

[75] Inventors: Akihiko Takase, Tokyo; Kenji Ochiai, Kokubunji, both of Japan

[73] Assignees: Hitachi, Ltd.; Hitachi Communication System, both of Tokyo, Japan

[21] Appl. No.: 12,612

[22] Filed: Feb. 9, 1987

[30] Foreign Application Priority Data
Feb. 7, 1986 [JP] Japan .................................. 61-23800

[51] Int. Cl.$^4$ ............................................. H03D 3/18
[52] U.S. Cl. ....................................... 329/50; 375/82; 375/83
[58] Field of Search ......................... 329/50, 110, 112; 375/52, 83, 82

[56] References Cited
U.S. PATENT DOCUMENTS

| | | | |
|---|---|---|---|
| 3,987,422 | 10/1976 | Yanagidaira et al. | 375/83 X |
| 4,547,738 | 10/1985 | Bayer et al. | 329/50 X |
| 4,694,257 | 9/1987 | Klein et al. | 329/50 |

FOREIGN PATENT DOCUMENTS

51-48959 4/1976 Japan .
0554125 1/1980 Japan .

Primary Examiner—Eugene R. LaRoche
Assistant Examiner—Robert J. Pascal
Attorney, Agent, or Firm—Antonelli, Terry & Wands

[57] ABSTRACT

A demodulator for demodulating a phase shift keying signal to regenerate a data signal. The demodulator comprises a clock generator for generating three-phase clock signals which are of substantially the same frequency as a carrier frequency of the phase shift keying signal and 120° out of phase from each other, phase difference detectors for detecting phase differences of the phase shift keying signal relative to respective three-phase clock signals, a timing extractor for producing a data clock signal by fetching the three-phase clock signals and detected phase differences, and a phase difference change detector for producing the data signal by detecting the presence or absence of a change of phase difference between portions of the phase shift keying signal corresponding to preceding and succeeding bits of the data clock signal.

11 Claims, 9 Drawing Sheets

$$\Delta\phi_a = \frac{\Delta t_a}{t} \times 360°$$

$$\Delta\phi_b = \frac{\Delta t_b}{t} \times 360°$$

PHASE DIFFERENCE = Sgn × Min [$\Delta\phi_a, \Delta\phi_b$]

PHASE SHIFT KEYING SIGNAL DEMODULATION METHOD AND APPARATUS

BACKGROUND OF THE INVENTION

This invention relates generally to a transmission system for transmitting data by utilizing a phase shift keying signal (hereinafter referred to as a PSK signal) which is obtained by phase-shift keying a carrier wave with a data signal and more particularly to a method and apparatus for demodulating the PSK signal to regenerate the data signal which are switable for realization of a PSK signal demodulator in the form of a digital integrated circuit.

Figure 1:
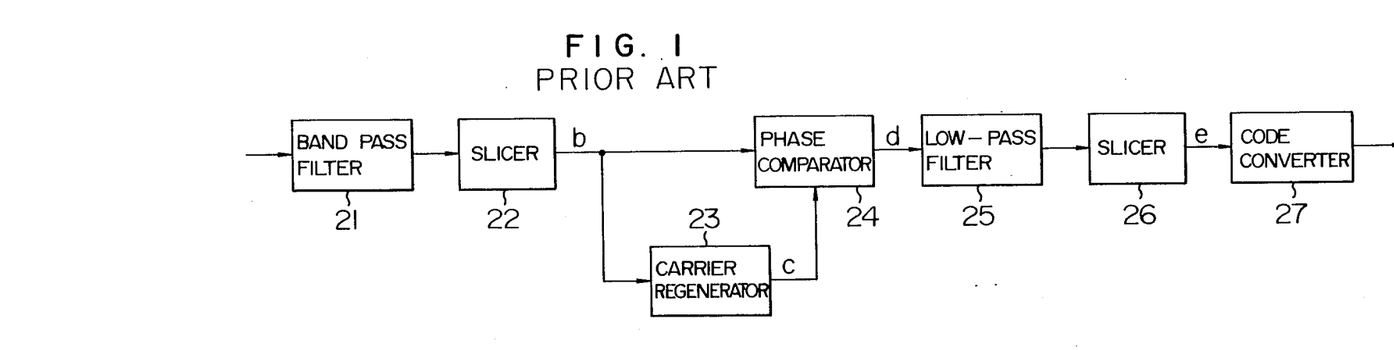
FIG. 1 is a schematic block diagram showing a conventional PSK signal demodulator.
Figure 2:
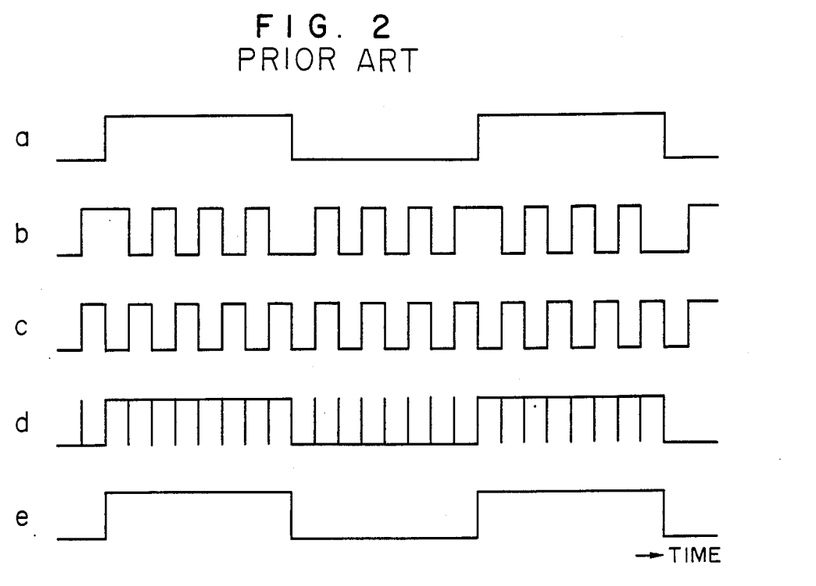
FIG. 2 illustrates waveforms appearing in the demodulator of FIG. 1.

A coherent detection scheme as diagrammatically shown in FIG. 1 is well known as a method for demodulating the PSK signal to regenerate the data signal. Digital data is differentially coded to obtain a signal a in FIG. 2 and a carrier is phase-shift keyed with the signal a to produce a PSK signal which is transmitted on a transmission line. The PSK signal is received by a band-pass filter 21 and converted by a slicer (limiter) 22 into a waveform b as shown in FIG. 2. The waveform b branches, on the one hand, to a carrier regenerator 23 which regenerates from the waveform b the carrier, designated at C in FIG. 2, serving as a reference phase and, on the other hand, to a phase comparator (coherent detector) 24 which performs coherent detection of the waveform b by using the regenerated carrier C. The output signal of the phase comparator 24 takes a waveform d which contains noise pulses due to jitter based on noise added to the signal as it propagates on the transmission line and a phase error of the regenerated carrier C. The noise pulses can be removed by means of a low-pass filter 25 and a slicer 26. Thus, the output signal of the slicer 26 takes a waveform e. A code converter 27 is adapted to decode the differentially coded data signal.

It will be seen from the above that the coherent detection scheme includes analog circuits such as carrier regenerator 23 and low-pass filter 25. Conventionally, some systems have been directed to replacement of the analog circuits with digital circuits suitable for integrated and adjustless form. For example, JP-A-No. 51-48959 and JP-A-No. 55-4125 disclose realization of the low-pass filter 25 with a digital circuit.

Thus, prior systems are dedicated to the realization of the low-pass filter 25 with a digital circuit, indispensably requiring the regeneration of the carrier. No realization of the carrier regeneration with a digital circuit can be found in any prior art devices. This is because the carrier regeneration is essentially, an analog operation which is carried out on the time axis. Accordingly, it has hitherto been difficult to achieve complete realization of the demodulator with a digital circuit.

SUMMARY OF THE INVENTION

This invention intends to overcome difficulties conventionally encountered in the carrier regeneration and has for its object to provide a PSK signal demodulation method and apparatus which can permit complete realization of a PSK signal demodulator with a digital integrated circuit.

According to the invention, to accomplish the above object, a clock signal is generated which is asynchronous with a carrier frequency of a PSK signal, a phase difference between the asynchronous clock signal and the PSK signal is detected, and the PSK signal is demodulated on the basis of the phase difference to regenerate a data signal.

In order to demodulate a differentially coded PSK signal, it is not necessary to know the absolute phase of the PSK signal but knowledge of the presence or absence of a phase difference between one bit of a data signal included in the PSK signal to be demodulated and a bit immediately preceding the one bit is suitable for the intended purpose. Specifically, a phase comparison of the two bits indicates that currently received data is a logic "1" when the phase difference is $\pi$ and a logic "0" when the phase difference is zero. The presence or absence of the phase difference between two bits can be decided by extracting a bit timing clock or data clock and detecting the presence or absence of a phase change during one cycle of this clock. In the past, a clock signal synchronized with a carrier is used to detect the presence or absence of a bit/bit phase change and eventually to detect the presence or absence of a phase difference between the clock signal and a PSK signal. However, in order to examine a phase change between two bits, having the clock signal completely synchronized with the carrier is not always necessary, but a clock signal may suffice which has a substantially constant phase difference relative to the carrier over at least two bits. Practically, a clock signal with about $10^{-4}$ frequency deviation can readily be generated by a common crystal oscillator and may be used conveniently for decision of the presence or absence of a phase change.

The extraction of a bit timing clock can be effected by extracting a phase change timing of the PSK signal.

DESCRIPTION OF THE PREFERRED EMBODIMENTS

Figure 3:
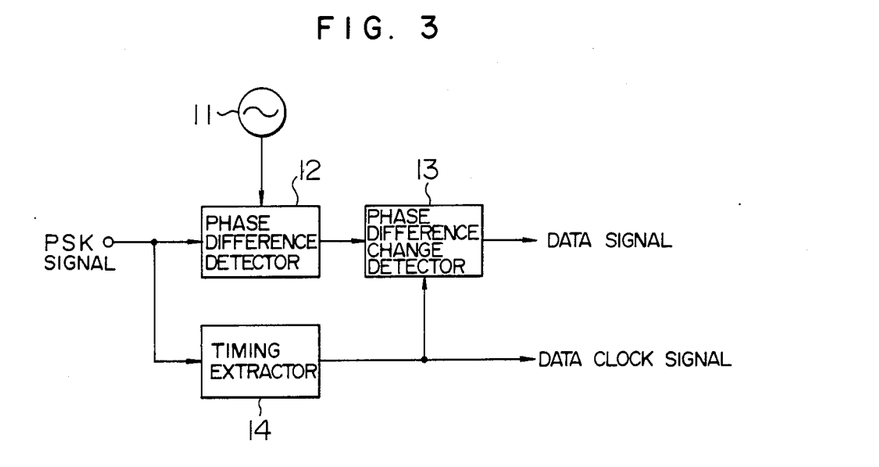
FIG. 3 is a schematic block diagram showing a PSK signal demodulator according to an embodiment of the invention.
Figure 4:
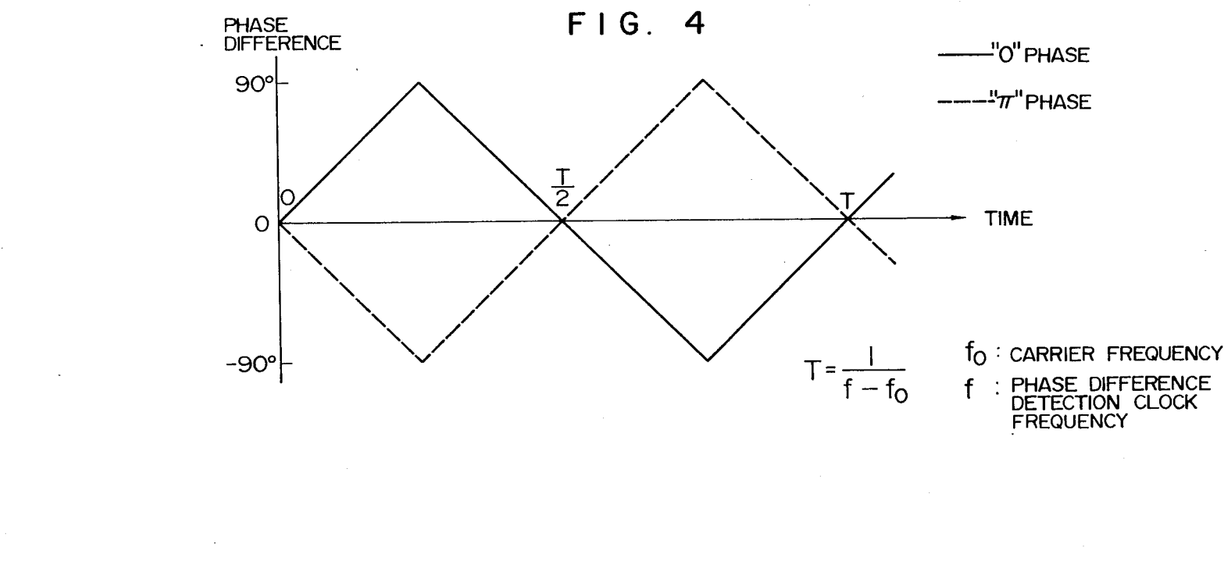
FIGS. 4 to 6 are diagrams useful to explain the operation of the FIG. 3 demodulator.
Figure 5:
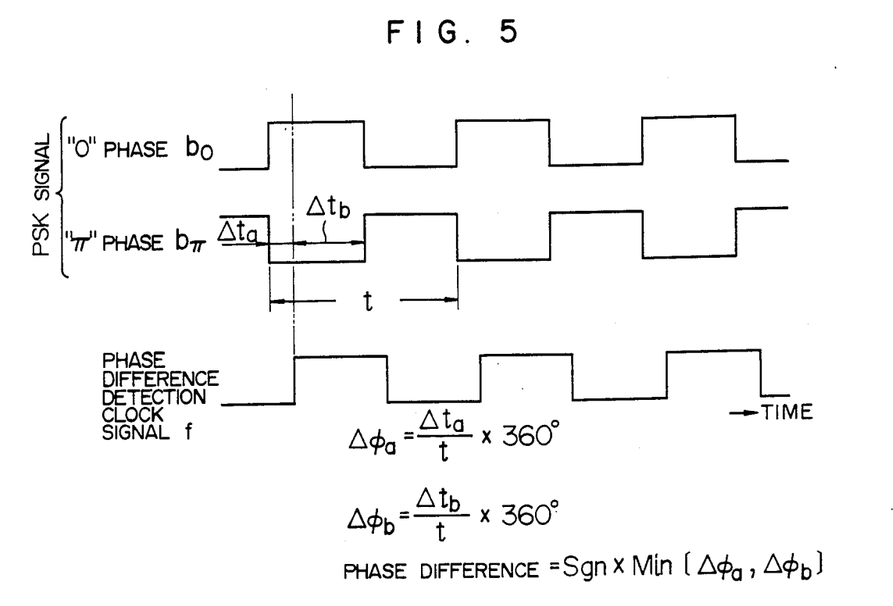

Referring now to FIG. 3, there is illustrated a basic embodiment of the present invention. As diagrammatically shown, a phase difference between a phase difference detection clock signal delivered out of a phase difference detection clock generator 11 and a PSK signal is detected by a phase difference detector 12 and the presence or absence of a change of phase difference is decided or detected by a phase difference change detector 13 responsive to a data clock signal delivered out of a timing extractor 14. Since the phase difference detection clock signal is not synchronized with a carrier, the phase difference between phase difference detection clock signal and PSK signal varies at a difference frequency between the phase difference detection clock frequency and the carrier frequency. Specifically, the phase difference of the phase difference detection clock signal relative to a "0" phase and a "π" phase of the PSK signal varies at the difference frequency between phase difference detection clock frequency f and PSK signal carrier frequency $f_0$ as graphically illustrated in FIG. 4. The phase difference between PSK signal and phase difference detection clock signal is herein defined as illustrated in FIG. 5. More particularly, when considering a phase difference between the leading edge of the phase difference detection clock signal and the leading edge of the PSK signal ("0" phase waveform being $b_0$ and "π" phase waveform being $b_\pi$) as well as a phase difference between the leading edge of the phase difference detection clock signal and the trailing edge of the PSK signal, the smaller one is selected from the two phase differences and multiplied by a sign Sgn which is positive when the PSK signal is at a "High" level at the time that the leading edge of the phase difference detection clock signal occurs but negative when the PSK signal is "Low" at the timing of the leading edge of the phase difference detection clock signal. This definition can be validated by the fact that the demodulation of the differentially coded PSK signal does not require discrimination between "0" phase and "π" phase.

In the arrangement of FIG. 3, the presence or absence of a phase change of the PSK signal is detected as a difference between the phase difference of the "0" phase PSK signal (waveform $b_0$ in FIG. 5) relative to the phase difference detection clock signal and the phase difference of the "π" phase PSK signal (waveform $b_\pi$ in FIG. 5) relative to the phase difference detection clock signal. Such a difference is indicated by a difference between the solid curve and the dotted curve in FIG. 4. As will clearly be seen from FIG. 4, the difference in phase difference becomes zero at an instant that the time measures T/2, T, . . . where T is the period of the difference frequency and the detection of the presence or absence of a phase change becomes impossible. This means that the error rate of this demodulation scheme amounts to the order of frequency deviation of the phase difference detection clock.

Figure 6:
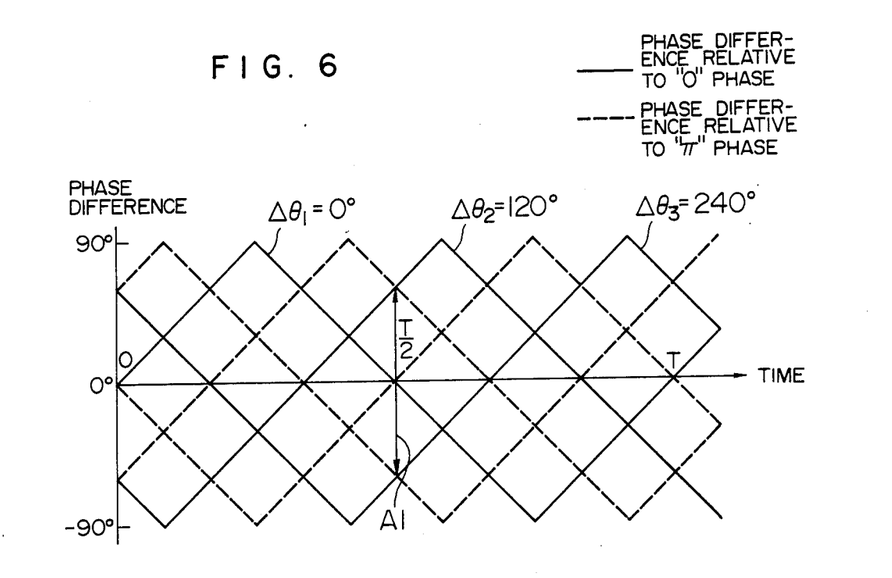

To improve the error rate performance, the phase difference detection clock signal may preferably be modified so that n (n being an integer) phase difference detection clock signals of different phases are used and the results of demodulation based on these clock signals are decided by majority as explained below. FIG. 6 illustrates an instance of three-phase clock signals. The respective phase difference detection clock signals have phase differences $\Delta\theta_1$, $\Delta\theta_2$ and $\Delta\theta_3$ with respect to the first (phase-component) phase difference detection clock signal. It should be understood from FIG. 6 that even at instants 0, T/2, T, . . . where the presence or absence of a phase change can not be detected using only the phase difference detection clock signal represented by $\Delta\theta_1$, a difference between phase difference detection clock signals represented by $\Delta\theta_2$ and $\Delta\theta_3$, as indicated by arrow $A_1$ in FIG. 6. A plurality of differences in phase difference are decided by majority to ensure accurate detection.

Figure 7:
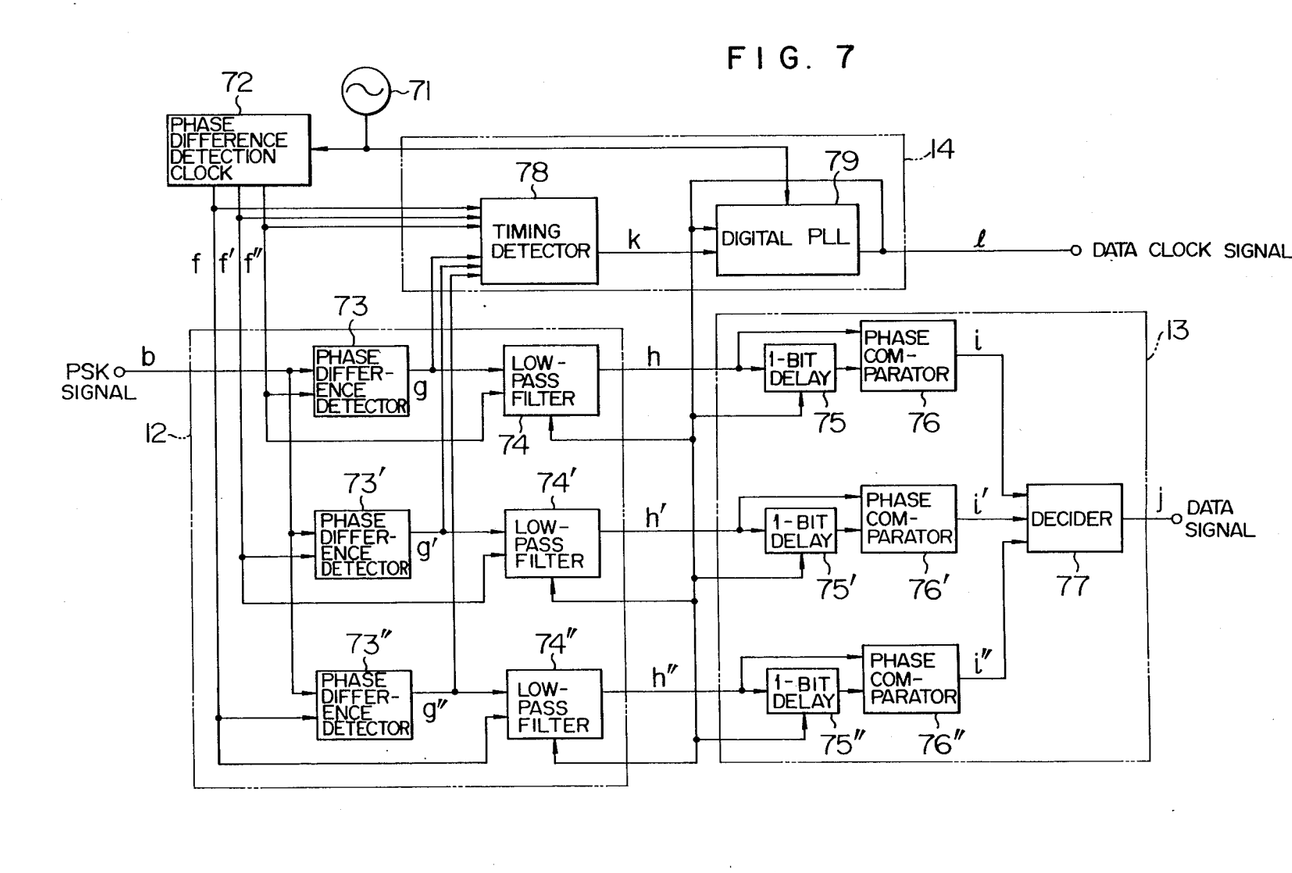
FIG. 7 is a block diagram of a circuit arrangement for preferred implementation of the FIG. 3 demodulator.
Figure 8:
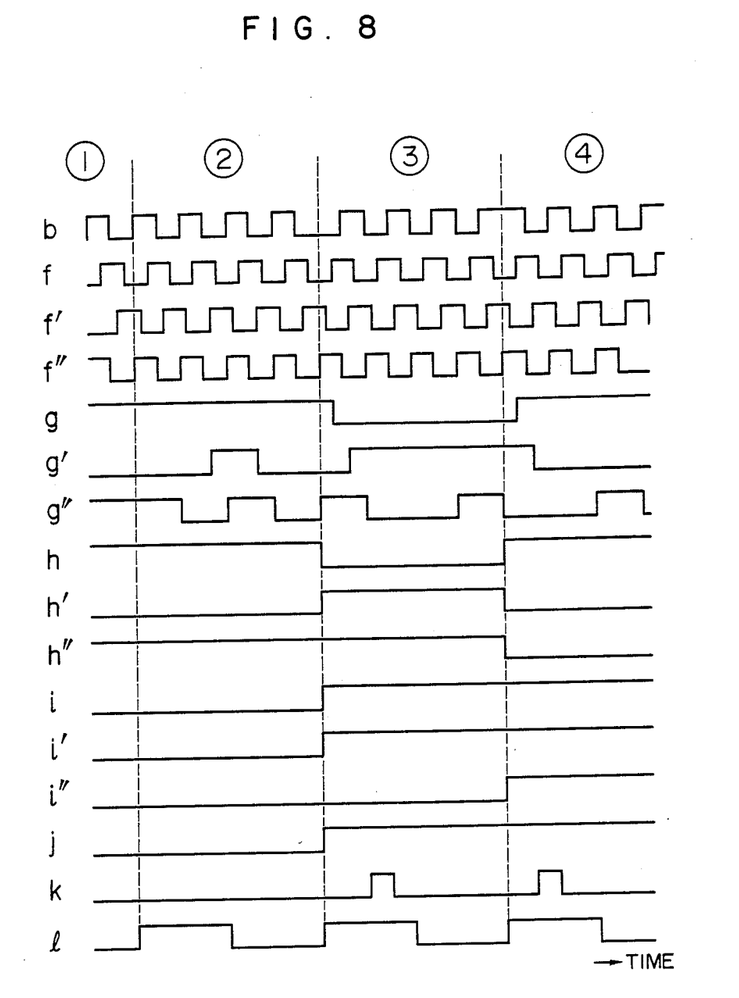
FIG. 8 illustrates waveforms appearing in the circuit of FIG. 7.

Thus, the FIG. 3 demodulator is preferably implemented as illustrated in FIG. 7 by using a plurality of phase difference detection clock signal generators Waveforms, as shown in FIG. 8 designated by identical reference characters to those of FIG. 7.

After being converted into a waveform b in FIG. 8 by a band-pass filter such as component 21 in FIG. 1 and a slicer 22 in FIG. 1, a PSK signal is applied to a demodulator of FIG. 7. The output signal of a crystal oscillator 71 is converted by a phase difference detection clock generator 72 into phase difference detection clock signals f, f' and f'' of three phases which are 120° out of phase from each other. The PSK signal b branches to three phase difference detection circuits 73, 73' and 73'' so as to be supplied thereto along with the three-phase phase difference detection clock signals f, f' and f''. Phase differences of the PSK signal b relative to the respective phase difference detection clock signals f, f' and f'' are quantized into binary values by means of the phase difference detection circuits 73, 73' and 73'', respectively. The binary "High" and "Low" levels resulting from quantization by the circuits 73, 73' and 73'' correspond to the positive and negative phase differences defined in FIG. 5, respectively. The phase difference detection is carried out at the rate of one cycle of the respective phase difference detection clock signals f, f' and f''. The received PSK signal contains noise added as it propagates on the transmission line. These noises are converted by the slicer such as component 22 in FIG. 1 into jitter of the PSK signal b. Accordingly, as the phase difference of the PSK signal b relative to the respective phase difference detection clock signals f, f' and f'' approximates to 0°, the possibility of erroneous phase detection becomes higher, thus causing errors as diagrammatically shown in waveforms g' and g''. Specifically, the waveform g' contains one erroneous phase detection at time slot ②. Since the waveform g'' has a nearly 0° phase difference due to the fact that the leading edge of the PSK signal b substantially coincides with that of the phase difference detection clock signal f'', it contains erroneous phase detections occurring repetitiously at each time slot.

Output signals g, g' and g'' of the phase difference detection circuits 73, 73' and 73'' branch on the one hand to a phase change timing detector 78 and on the other hand to low-pass filters 74, 74' and 74'', respectively. The timing detector 78 detects a phase changing timing of the PSK signal b on the basis of the output signals g, g' and g''. Specifically, this detection is performed by determining that the phase of the PSK signal b changed during one cycle only when level changes of the respective output signals g, g' and g'' of the phase difference detection circuits 73, 73' and 73'' concurred commonly during the one cycle of any one of the phase difference detection clock signals f, f' and f'', as indicated by a pulse waveform k. This eliminates the influence of the erroneous phase detection occurring in the waveforms g' and g''. By using the pulse waveform k as a reference, a digital phase-locked loop (PLL) 79 extracts a data clock signal l. The PLL 79 divides the output signal of the crystal oscillator 71 and changes the dividing ratio on the basis of a result of phase comparison between divider output signal l and reference pulse k. Consequently, the output signal l is synchronized with the timing of phase change of the PSK signal b. At a time slot where no phase change occurs, the timing detector 78 fails to detect timing. In such a case, the digital PLL 79 is caused to stop the phase comparison, keeping the dividing ratio unchanged. In this manner, the data clock signal l can be extracted.

The waveforms g, g' and g'' passed through the low-pass filters 74, 74' and 74'' can be removed of noises to provide waveforms h, h' and h''. The low-pass filters 74, 74' and 74" are digital integrate-and-dump filters which are resetable by the data clock signal l. The waveforms h, h' and h" branch on the one hand to one-bit delay circuits 75, 75' and 75" at which they are delayed by one cycle of the data clock signal l and on the other hand to phase comparators 76, 76' and 76". Accordingly, the phase comparators 76, 76' and 76" compare phases of the waveforms h, h' and h" with those of delayed output signals of the delay circuits 75, 75' and 75" to produce output signals having waveforms i, i' and i". As illustrated in FIG. 8, the waveform i becomes logic "0" when the waveform h takes the same logic level before and after the leading edge of the data clock signal l but becomes logic "1" when the waveform h takes different logic levels before and after the leading edge of the data clock signal l. Similarly, the waveform i' becomes logic "0" for the same logic level of the waveform h' but logic "1" for different logic levels of the waveform h' before and after the leading edge of the data clock signal l, and the waveform i" becomes logic "0" for the same logic level of the waveform h" but logic "1" for different logic levels of the waveform h" before and after the leading edge of the data signal l. A decider 77 selects the majority from the waveforms i, i' and i" to produce a data signal j. Specifically, at a time slot ③ in FIG. 8, for example, the logic levels of the two waveforms i and i' are both "1" and the logic level of the waveform i" is "0", so that the logic level of the data signal j which is the result of the selection of the majority of these waveforms becomes "1" as shown in FIG. 8.

Figure 9:
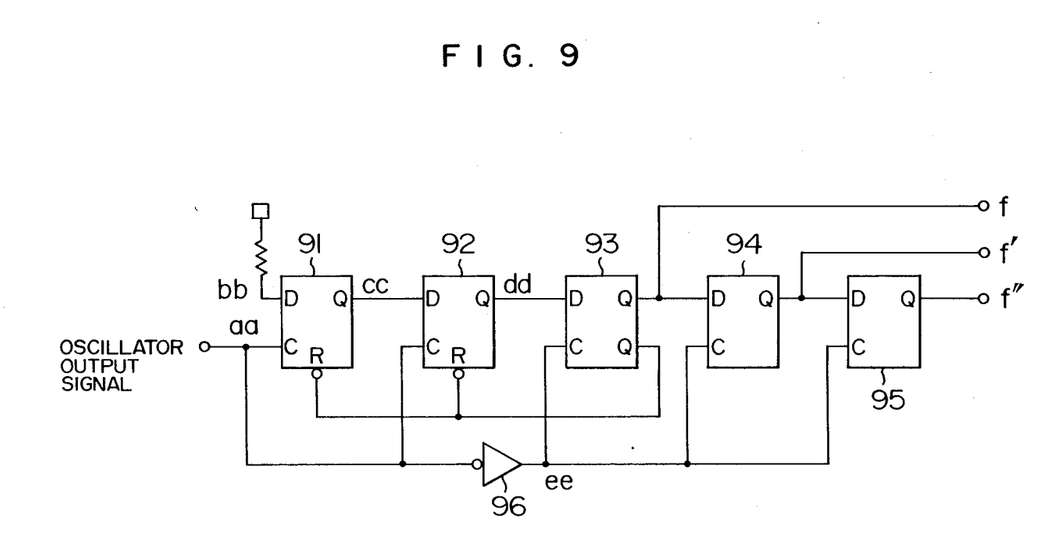
FIGS. 9, 11 and 13 are circuit diagrams of function blocks in the FIG. 7 circuit.
Figure 10:
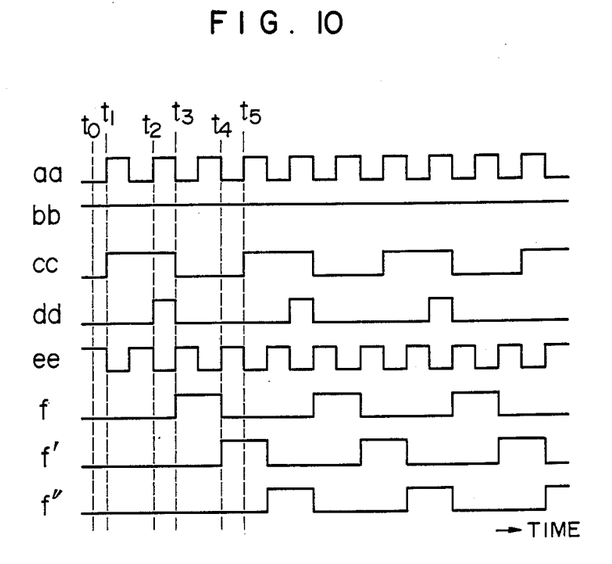
FIG. 10 illustrates waveforms appearing in the FIG. 9 circuit.

The operation of each function block in FIG. 7 will be detailed below. FIG. 9 is a circuit diagram of the phase difference detection clock generator 72 and FIG. 10 illustrates waveforms appearing therein. The phase difference detection clock generator 72 receives a clock signal aa of a frequency which is approximately three times as large as the carrier frequency of the PSK signal and delivers phase difference detection clock signals f, f' and f" of three phases. In operation, all of flip-flops 91 to 95 are assumed to be reset in their initial states at time $t_0$. A leading edge of the input clock signal occurring at time $t_1$ sets the flip-flop 91 (waveform cc in FIG. 10) and the subsequent leading edge of the input clock signal occurring at time $t_2$ sets the flip-flop 92 (waveform dd in FIG. 10). The input clock signal aa is inverted by an inverter 96 and a leading edge of inverting clock signal ee occurring at time $t_3$ sets the flip-flop 93 and as a result, the flip-flops 91 and 92 are reset. The subsequent leading edge of the inverting clock signal occurring at time $t_4$ resets the flip-flop 93, thus returning the flip-flops 91, 92 and 93 to their initial states. In this way, the frequency of input clock signal aa is divided by three to provide the phase difference detection clock signal f. The clock signal f is shifted by one cycle of clock signal aa at the flip-flop 94 acting as a shift register to provide the phase difference detection clock signal f', and the clock signal f' is shifted by the same amount at the flip-flop 95 also acting as a shift register to provide the phase difference detection clock signal f". Now, in FIG. 10, a clock bb is pulled up to a high level. A time point $t_5$ shows a timing where a clock cc changed into the same state as a time point $t_1$ after three-cycles of the clock aa. After the time point $t_5$, the conditions between the time points $t_1$ and $t_5$ are repeated.

The phase difference detectors 73, 73' and 73" can readily be materialized with edge triggered type flip-flops in order that the phase difference can be detected to be positive when the PSK signal (waveform b in FIG. 8) is at a "High" level at the time that the leading edges of the phase difference detection clock signals f, f' and f" occur but it can be detected to be negative when the PSK signal is at "Low" level at the same timing.

Figure 11:
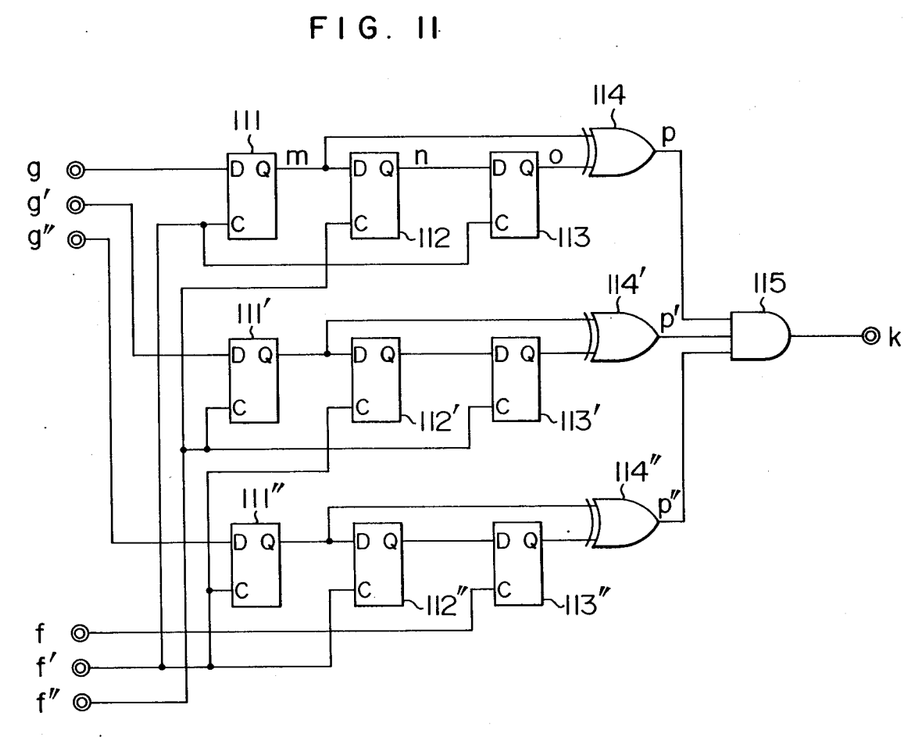
Figure 12:
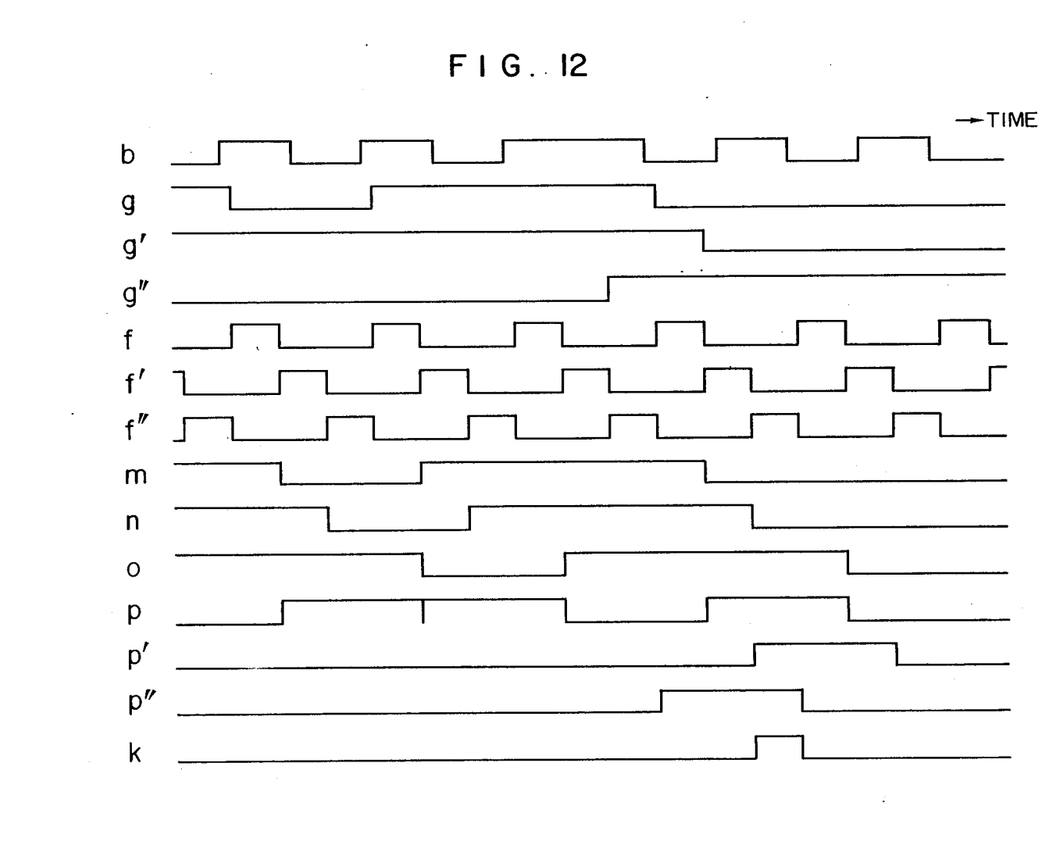
FIG. 12 illustrates waveforms appearing in the FIG. 11 circuit.

FIG. 11 illustrates one example of the timing detector 78 and FIG. 12 shows waveforms appearing therein, indicating the PSK signal by waveform b, the output signals of phase difference detection circuits 73, 73' and 73" by waveforms g, g' and g" and the three-phase phase difference detection clock signals by waveforms f, f' and f". The timing detector is supplied with the waveforms f, f' and f" and waveforms g, g' and g". For simplicity of explanation, one channel including flip-flops 111, 112, 113 and an exclusive OR gate 114 will be described. This channel responds to the waveform g and waveforms m, n and o develop therein. The remaining channels respectively including flip-flops 111', 112', 113' and an exclusive OR gate 114' and flip-flops 111", 112", 113" and an exclusive OR gate 114" operate in a similar manner. The waveforms f' and f" act as timing clock signals and so, at the phase changing point, the input waveform g is converted into a pulse signal p of a width equal to one cycle of the carrier. The other input waveforms g' and g" are likewise converted into pulse signals p' and p". These pulse signals p, p' and p" are ANDed at an AND gate 115 to produce the timing pulse k representative of the phase changing point. The waveform g is illustrated as containing a detection error. Even in the event of occurrence of the phase detection error, the logical AND can prevent the timing pulse from occurring at an incorrect position.

The low-pass filters 74, 74' and 74" can be constituted with frequency counters. These frequency counters are connected at their clock inputs to receive the clock signals f, f' and f" and at their enable inputs to receive the output signals of the phase difference detection circuits 73, 73' and 73". The frequency counters are then permitted to count the clock signals only when their enable inputs are at a "High" level, and they are reset at the timing of the data clock signal l. When counts measured immediately before resetting exceed a predetermined value, the frequency counters produce a "High" level signal but in the other case, they produce a "Low" level signal. In this way, these counters act as integrate-and-dump filters and play the part of low-pass filters.

The one-bit delay circuits 75, 75' and 75" can be constituted with shift registers utilizing the data clock signal l.

Figure 13:
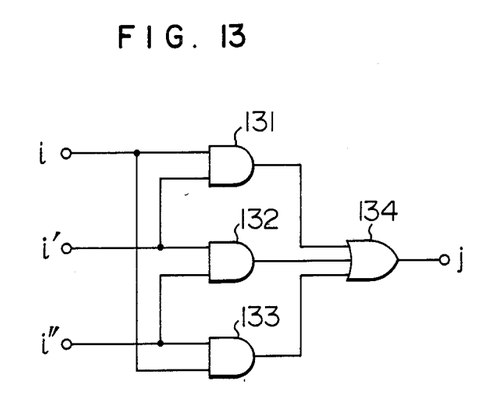

FIG. 13 illustrates one example of the decider 77. This circuit operates to produce a "High" level output signal j only when any two of the input signals i, i' and i" are at a "High" level.

This embodiment considers the noise added to the signal as it propagates on the transmission line and includes the low-pass filters 74, 74' and 74". But if the noise is small, the low-pass filters may be omitted.

This embodiment has been described as using the three-phase phase difference detection clock signal but the number of phases is not limited to three and phase difference detection clock signals of more than three phases may be employed.

As has been described, according to the present invention, the PSK signal can be demodulated without resort to an analog operation on the time axis such as phase synchronization with the carrier. Thus, analog components such as carrier regeneration filters and voltage controlled oscillators can be dispensed with and the PSK signal can be demodulated using a digital device such as a gate array in cooperation with only one external device serving as the oscillator adapted to generate the frequency signal which is approximately an integer times the carrier frequency. Consequently, only one digital LSI and one oscillator, such as a crystal oscillator, suffice and the cost can be reduced considerably. In addition, the demodulator of this invention does not require adjustment which also reduces the cost.

We claim:

1. A demodulator for demodulating a phase shift keying signal to regenerate a data signal, said demodulator comprising:
   means for generating a clock signal asynchronous with a carrier frequency of said phase shift keying signal;
   means for detecting a phase difference between said clock signal and said phase shift keying signal;
   means for detecting a change in said phase difference; and
   means for producing the data signal of the basis of the detected change in said phase difference.

2. A demodulator for demodulating a phase shift keying signal to regenerate a data signal, said demodulator comprising:
   means for generating n-phase (n being an integer) clock signals which are of substantially the same frequency as a carrier frequency of said phase shift keying signal and 360°/n out of phase from each other;
   means for quantizing phase difference of said phase shift keying signal relative to respective n-phase clock signals into binary value;
   means for detecting changes in the quantized phase differences between adjacent bits of said data signals and for generating a logic "1" or "0" based on a change or no change, respectively; and
   means for selecting a majority binary value for said data signal by selecting the logic level that occurs most often in n detection results.

3. A demodulator according to claim 2, wherein said quantizing means comprises a detector for quantizing said phase difference into a binary value at the rate of one cycle of said carrier frequency of said phase shift keying signal, and a frequency counter which provides a count operation only when the output signal of said detector has a predetermined level and is reset to a predetermined reference state at a timing determined by a bit clock signal corresponding to the data signal.

4. An apparatus for demodulating a phase shift keying signal to regenerate a data signal, said apparatus comprising:
   first means for generating a clock signal used for phase difference detection;
   second means, connected to said first means, for detecting a phase difference between the phase shift keying signal and said clock signal;
   third means for extracting a phase changing timing at which switching occurs between a portion of said phase shift keying signal corresponding to one bit of said data signal and another portion of said phase shift keying signal corresponding to a bit immediately preceding said one bit of said data signal; and
   fourth means, connected to said second and third means, for producing said data signal by detecting the presence or absence of a change of a phase difference between the portions of said phase shift keying signal corresponding to the bits respectively occurring before and after said phase changing timing.

5. An apparatus for demodulating a phase shift keying signal to regenerate a data signal, said apparatus comprising:
   first means for generating n-phase (n being integer) clock signals which are of substantially the same frequency as a carrier frequency of said phase shift keying signal and 360°/n out of phase from each other;
   second means, connected to said first means, for detecting phase differences of said phase shift keying signal relative to respective n-phase clock signals;
   third means, connected to said first and second means, for producing a data clock signal by fetching said n-phase clock signals and detected phase differences; and
   fourth means, connected to said second and third means, for producing said data signal by detecting the presence or absence of a change of phase difference between portions of said phase shift keying signal corresponding to preceding and succeeding bits of said data clock signal.

6. A demodulation apparatus according to claim 5, wherein said second means comprises a phase difference detection circuits for quantizing phase differences of said phase shift keying signal relative to respective n-phase clock signals into binary values.

7. A demodulation apparatus according to claim 5, wherein said third means comprises a timing detector for producing a reference pulse signal from said clock signals and said phase differences, and a digital phase-locked loop for producing said data clock signal on the basis of said reference pulse signal.

8. A demodulation apparatus according to claim 5, wherein said fourth means comprises phase comparators for phase comparison between each phase difference and a signal resulting from delaying each phase difference by one cycle of said data clock signal, and a decider for selecting the logic level "1" or "0" which occurs most often among logic level output signals of said phase comparators to produce said data signal.

9. A method for demodulating a phase shift keying signal to regenerate a data signal, said method comprising the steps of:
   generating a clock signal used for phase difference detection;
   detecting a phase difference between the input phase shift keying signal and said clock signal;
   extracting a phase changing timing at which switching occurs between a portion of said phase shift keying signal corresponding to one bit of said data signal and another portion of said phase shift keying signal corresponding to a bit immediately preceding said one bit of said data signal; and
   producing said data signal by detecting the presence or absence of change of phase difference between the portions of said phase shift keying signal corresponding to the bits respectively occurring before and after said phase changing timing.

10. A method for demodulating a phase shift keying signal to regenerate a data signal, said method comprising the steps of:
   generating n-phase (n being integer) clock signals which are of substantially the same frequency as a carrier frequency of said phase shift keying signal and 360°/n out of phase from each other;

detecting phase differences of said phase shift keying signal relative to respective n-phase clock signals;

producing a data clock signal by fetching said n-phase clock signals and detected phase differences; and producing said data signal by detecting the presence of a change of phase difference between portions of said phase shift keying signal corresponding to preceding and succeeding bits of said data clock signal.

11. A demodulation method according to claim 10, wherein the step of producing said data signal comprises:

delaying each phase difference of said data clock signal by one cycle;

comparing each phase difference with each delayed phase difference; and selecting as said data signal the logic level "1" or "0" which occurs as a majority among "n" comparing results.

* * * * *